March 19, 1963 I. M. VOGT 3,082,409

FERROELECTRIC COUNTING CIRCUIT

Filed Nov. 13, 1958

INVENTOR
I. M. VOGT
BY John E. Cassidy
ATTORNEY

United States Patent Office 3,082,409

Patented Mar. 19, 1963

3,082,409
FERROELECTRIC COUNTING CIRCUIT

Irmfried M. Vogt, East Orange, N.J., assignor to Bell Telephone Laboratories, Incorporated, New York, N.Y., a corporation of New York Filed Nov. 13, 1958, Ser. No. 773,683
13 Claims. (Cl. 340—173.2)

Figures 1, 2:
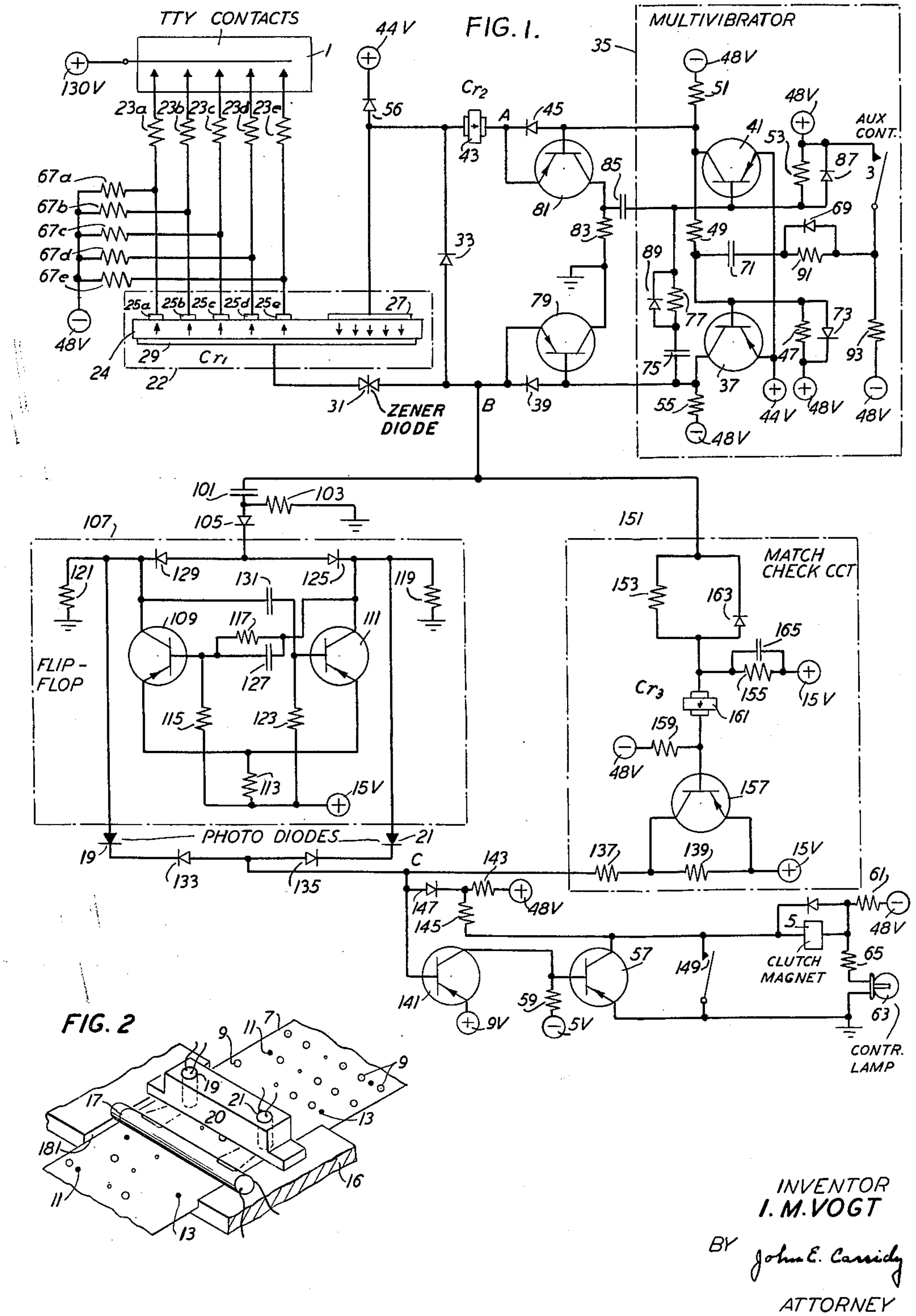

This invention relates to electrical storage circuits and more particularly to storage circuits for counting parallel pulses.

It is a general object of this invention to provide an improved storage circuit for converting parallel pulses to serial pulses.

It is another object of this invention to provide a self-driven pulse counter storage circuit for generating output pulses in accordance with the number of pulses stored therein.

It is a more specific object of this invention to provide a self-driven counting circuit for supplying output pulses in accordance with the number of parallel input pulses.

It is a further object of this invention to provide an improved counting circuit employing ferroelectric capacitors.

As is known, ferroelectric capacitors or crystals exhibit rectangular hysteresis loops when applied electric field is plotted against polarization. These ferroelectric capacitors can be polarized in one direction by the application of a pulse of predetermined polarity across the capacitor and this remnant polarization is stored or memorized. The polarization of the crystal can then be reversed or switched by the application of a pulse of the opposite polarity. Crystals ordinarily maintain a low capacitance and therefore a high impedance. However, while switching, the crystal presents a high capacitance exhibiting a potential drop which does not exceed the coercive potential of the crystal, which roughly approximates seven volts, for example. Furthermore, crystals in series cannot be switched by the application of a pulse across the crystals if they are initially polarized or oriented in opposite directions. As disclosed in R. M. Wolfe application Serial No. 552,459 now Pat. #2,854,590, filed December 12, 1955, when two capacitors A and B of different electrode area are serially connected, the number of reversals of polarity of the smaller capacitor A required to completely reverse the polarity of the larger capacitor B is equal to the ratio of the electrode area of capacitor B to capacitor A. In other words, each reversal of the polarity of the smaller capacitor, in reponse to the application of a pulse across the capacitors, will fractionally or partially reverse or switch the polarity of the larger capacitor to the extent equal to the ratio of the electrode area of the smaller capacitor to the electrode area of the larger capacitor.

In accordance with one aspect of this invention, a counting circuit utilizes ferroelectric capacitors and specifically series connected capacitors of unequal size. A single large crystal B is connected in individual series circuits with each of a plurality of small crystals A of unit size initially polarized in the same direction as the large crystal. The application of each input pulse across a small crystal A and the large crystal B switches the small crystal A and partially switches the large crystal B whereby the polarization of the large crystal B is reoriented to the extent equal to the sum of the unit areas of the small reoriented crystals A. Another small crystal C, which has the same electrode area as each of the small crystals A, is connected in series with the large crystal B but initially oriented in the opposite direction and thus oriented in the same direction as the partially reoriented polarization of the large crystal B switched by the application of the input pulses. A monostable multivibrator, connected across the large crystal B and the other small crystal C, provides alternate pulses of opposite polarity. Each pulse of one polarity switches the other small crystal C and, in series, reswitches the partial reoriented large crystal B to the extent equal to the area of the small crystal C and therefore equal to the area of each of the small input crystals A. The multivibrator pulses of the other polarity reorients the crystal C which, while being switched, acts to gate the pulse to reset the multivibrator whereby another oscillating pulse cycle is generated. When the number of pulse cycles equals the number of input pulses, the partially switched large crystal B is fully reoriented to the initial state whereby the large crystal B and the other crystal C are oriented in opposite directions and the crystal C is not switched by the multivibrator pulse. The reset pulse path is therefore blocked by the further crystal and the multivibrator stops oscillating.

In accordance with a specific embodiment of this invention, the circuit is utilized to count the number of mark elements of each teletypewriter character transmitted by a transmitter-distributor.

The means for fulfilling the foregoing objects and the practical embodiment of this invention will be fully understood from the following description taken in conjunction with the accompanying drawing wherein:

FIG. 1 shows the circuits and equipments which form a specific embodiment of this invention; and FIG. 2 shows equipment which cooperate with the specific embodiment of this invention.

Referring now to FIG. 1, the teletypewriter transmitting contacts of a transmitter-distributor are shown in block 1 at the upper left in FIG. 1. A transmitter-distributor suitable for use in this system is described in Patent 2,296,845 granted to M. T. Goetz on September 29, 1942, and the patent is incorporated herein by reference as though fully set forth herein. The transmitter-distributor also includes auxiliary contact 3 which closes during the transmission of the start element of each teletypewriter character and reopens during the transmission of the fifth element of each teletypewriter character. The transmitter-distributor is also provided with clutch magnet 5, shown at the lower right in FIG. 1, which, when energized, releases the transmitter-distributor for operation enabling transmission therefrom. Message tape 7, FIG. 2, is inserted in recess 181 of top plate 16 of the transmitter-distributor and advanced step by step during the operation of the transmitter-distributor whereby the sensing pins, not shown, of the transmitter portion senses the rows of punch holes 9 in tape 7. As shown in detail in the above-mentioned Goetz patent, the operation of each sensing pin in accordance with punch holes 9 closes, in turn, individual transmitting contacts 1 to effect transmission of teletypewriter code signals.

In accordance with the specific embodiment of the present invention, black spot or mark 11 is marked on the upper portion of tape 7, as shown in FIG. 2, and aligned with each row of punch holes 9 containing an even number of punch holes designating a character with an even number of mark elements. Similarly, black spot or mark 13 is marked on the lower portion of tape 7 and aligned with each punched character containing an odd number of mark elements or punch holes 9. Positioned above the transmitter sensing pins and aligned with the even spots 11 is photodiode 19 and positioned above the sensing pins and aligned with the odd spots 13 is photodiode 21. Lamp 17 provides illumination for tape 7 at a point directly below photodiodes 19 and 21 which are affixed to shield 20 preventing direct illumination from reaching photodiodes 19 and 21. Photodiodes 19 and 21 exhibit a relatively low impedance when exposed to light reflected from tape 7 and a relatively high impedance when the light normally reflected from tape 7 is absorbed by black spot 11 or 13.

Returning now to FIG. 1, a storage device, generally indicated by block 22, is shown. Storage device 22 includes a slab of ferroelectric material 24, and affixed to its upper surface are electrodes or crystals 25*a* through 25*e*. The area of all of electrodes or crystals 25*a* through 25*e* are equal. On the upper surface of block 22, also is electrode 27, hereinafter referred to as tank crystal 27. Crystal 27 has an electrode area equal to or exceeding the sum of the electrode areas of crystals 25*a* through 25*e*. Affixed to the lower surface of slab 24 is electrode 29 which is common to each of the crystals 25*a* through 25*e* and 27. As disclosed in E. E. Schwenzfeger application Serial No. 646,998, filed March 19, 1957, which is hereby incorporated herein as though fully set forth herein, device 22 functions as a single large ferroelectric capacitor in series with five individual unit area electric capacitors, common electrode 29 constituting the junction between tank crystal 27 and unit area crystals 25*a* through 25*e*.

Crystals 25*a* through 25*e* are connected to individual contacts of normally open teletypewriter transmitting contacts 1 via resistors 23*a* through 23*e*. Double diode 31 comprising a pair of reversely connected Zener diodes, and switching diode 33 are connected across tank crystal 27. Diode 31 exhibits a reverse breakdown at a voltage somewhat in excess of the coercive potential of crystal 27.

Monostable multivibrator 35, comprising transistors 37 and 41, is connected across tank crystal 27 and Zener diode 31 wherein the collector of transistor 37 is connected to Zener diode 31 by way of diode 39 and junction B and the collector of transistor 41 is connected to tank crystal 27 by way of diode 45, junction A and ferroelectric capacitor or crystal 43. Crystal 43 has an electrode area equal to each of the unit areas of crystals 25*a* through 25*e*.

In the normal quiescent condition, the base of transistor 37, connected to the junction of resistance 47 and 49, is maintained slightly negative with respect to the emitter, as resistor 47 and 49 with resistor 51 form a voltage divider between positive and negative battery and the emitter of transistor 37 is connected to positive battery which, for example, might be several volts less positive than the positive battery applied to the above-mentioned voltage divider. The base of transistor 41 is slightly positive with respect to the emitter of transistor 41 as the base is connected to positive battery by way of resistor 53 and the emitter is connected to positive battery which, preferably, is several volts less positive than the battery connected to resistor 53. Thus transistor 41 is not conducting and its collector, connected to the junction of resistors 49 and 51, is substantially at ground potential due to the voltage divider action of resistors 47, 49, and 51. Junction A is therefore maintained at approximately ground potential. Since the base of transistor 37 is negative relative to its emitter, transistor 37 is conducting whereby collector current flows to negative battery by way of resistor 55 thus maintaining the collector of transistor 37 positive relative to the collector of transistor 41. This positive potential is applied to junction B by way of diode 39.

Crystals 25*a* through 25*e* are connected to negative battery by way of resistors 67*a* through 67*e*. Since tank crystal 27 is connected to the relatively positive voltage at junction B by way of diode 33 and tank crystal 27 is in series with unit area crystals 25*a* through 25*e*, the polarization or orientation of crystals 25*a* through 25*e* and tank crystal 27 are as shown, in FIG. 1, by the arrows immediately below the crystal electrodes. In addition, with junction A at substantially ground potential, the orientation of crystal 43 is as shown in FIG. 1.

The base of transistor 57, shown in the lower right-hand portion in FIG. 1, is connected to negative battery by way of resistor 59 and the base is negative relative to the emitter of transistor 57 which is connected to ground. Transistor 57 is therefore normally conducting and collector current flows to negative battery by way of clutch magnet 5 and resistor 61. The clutch magnet is therefore normally energized and the transmitter-distributor is normally released for operation. The emitter-to-collector impedance of normally conducting transistor 57 and the impedance of clutch magnet 5 are relatively low. The control lamp 63 and resistance 65 are shunted by this low impedance and control lamp 63 is therefore normally maintained de-energized.

Assuming now that a character with two mark elements is presented to the sensing pins of the transmitter-distributor, two contacts of transmitting contacts 1 responsively close if transmitting contacts 1 are operating properly. This supplies a positive pulse through two of the resistors 23*a* through 23*e*, two of the crystals 25*a* through 25*e*, tank crystal 27 and diode 56. As the voltage across tank crystal 27 cannot exceed the breakdown voltage of diode 31, which is in series with diode 33 across tank crystal 27, no current can flow through diode 31 and consequently the polarization of two of the crystals 25*a* through 25*e* and the polarization of tank crystal 27 to the extent equal to two-unit areas are reoriented in series.

During the transmission of the start element of the teletypewriter character, auxiliary contacts 3 close sending a positive pulse to the base of transistor 37 by way of diode 69 and capacitor 71 rendering transistor 37 nonconducting. With transistor 37 turned off, the voltage of the collector of transistor 37, which is connected to negative battery by way of resistor 55, is rapidly lowered. A negative pulse is thus sent from the collector of transistor 37 to the base of transistor 41 by way of capacitor 75 and resistor 77 whereby transistor 41 is turned on.

The negative going voltage of the collector of transistor 37 lowers the base voltage of transistor 79. Current therefore flows via the emitter and collector of transistor 79 to ground until junction B, which is connected to the emitter of transistor 79, is substantially at ground potential. With transistor 41 conducting, the collector of transistor 41 draws current raising its collector voltage and therefore the voltage of junction A by way of diode 45. Thus the voltage of junction A is at this time high relative to the voltage of junction B. A positive pulse is thus applied across crystal 43, tank crystal 27 and diode 31. Switching diode 33, shunting crystal 27 and diode 31, is reversely polled for the positive pulse and, at this time, acts as an open circuit. During the application of the positive pulse from junction A, crystal 43 is reoriented in series with one of the two units of tank crystal 27 previously switched, since crystal 27 is now oriented by an amount equivalent to two unit areas in the same direction as crystal 43 and crystal 43 has an electrode area equal to one unit.

During this time capacitor 75 is charging from positive battery via resistor 53 and resistor 77. When the voltage on the base of transistor 41, connected to the junction of resistor 53 and resistor 77, becomes more positive than the emitter voltage, transistor 41 turns off making the voltage on the collector of transistor 41 more negative and thus lowering the voltage on the base of transistor 37 by way of resistor 49 and transistor 37 turns on. The positive pulse from the collector of transistor 37 via condenser 75 is rapidly discharged via diodes 89 and 87 and multivibrator 35 is returned to the initial condition in which the voltage of junction B is substantially positive and the voltage of junction A is substantially at ground potential. Since crystal 43 has been reoriented, a positive pulse is thus gated from junction B to junction A via crystal 43 and switching diode 33, which now shunts diode 31 and crystal 27. Crystal 43 is again switched and a pulse of current is applied to junction A while crystal 43 is being switched. Since the emitter of transistor 81 is connected to junction A, the positive pulse of current applied to junction A momentarily turns on transistor 81 whereby collector current momentarily flows to ground by way of resistor 83. After crystal 43 is switched, the current pulse is removed, transistor 81 turns off and the current and voltage drop across resistor 83 decreases causing a negative impulse through capacitor 85 to the base of transistor 41 so that transistor 41 is again turned on and transistor 37 is turned off. This again renders the voltage of junction A positive relative to the voltage of junction B reorienting crystal 43 in series with the other of the two units in tank crystal 27 previously switched whereby tank crystal 27 is fully reoriented to its initial state.

When capacitor 75 sufficiently charges to raise the voltage of the base of transistor 41 above the emitter voltage of transistor 41, the transistor turns off and transistor 37 turns on in the same manner as previously described. A positive pulse of current is thus again passed from junction B to junction A via diode 33 and crystal 43 reorienting crystal 43 and momentarily turning on transistor 81 while crystal 43 is being switched. Transistor 41 is turned on in the same manner as before, turning off transistor 37 and thus raising the voltage of junction B relative to the voltage of junction A. However, tank circuit 27 is now oriented as shown in FIG. 1 and as crystal 43 and tank crystal 27 are oriented in opposite directions, the crystal 43 cannot again be reoriented.

When capacitor 75 charges and transistor 41 of monostable multivibrator 35 is again turned off and transistor 37 is turned on, the positive impulse from junction B cannot be passed to junction A by way of crystal 43 because crystal 43 is polarized in the wrong direction and therefore exhibits a high impedance. Thus transistor 81 is maintained nonconducting and transistors 37 and 41 of multivibrator 45 are maintained conducting and nonconducting, respectively.

When the transmitter-distributor subsequently transmits the fifth intelligence element, auxiliary contacts 3 reopen and capacitor 71 discharges to negative battery by way of resistor 93 preparing the path for the next positive pulse via contacts 3, diode 69 and capacitor 71 to the base of transistor 37. Thus, prior to the completion of the transmission of the teletypewriter character, multivibrator 35 has been reversed three times with two contacts of transmitter contacts 1 closed and three oscillations are obtained from junction B. It can readily be seen that with $n$ contacts closed, $n+1$ oscillations would be obtained from junction B.

Each oscillation at junction B is applied to the differentiating network comprising capacitor 101 and resistor 103 and the positive differentiated pulses obtained from the positive-going voltage transitions at junction B are applied from the junction of capacitor 101 and resistor 103 to flip-flop 107 by way of diode 105.

Flip-flop 107, which includes transistor 109 and transistor 111, is monostable in the quiescent condition. The emitters of transistors 109 and 111 are connected to positive battery by way of common resistor 113. The base of transistor 109 is connected to the junction of resistor 115 and resistor 117 which, in series with resistor 119, form a voltage divider between positive battery and ground. The base of transistor 109 is thus slightly negative relative to the emitter and transistor 109 is normally conducting in the quiescent condition. With transistor 109 conducting, collector current flows to ground by way of resistor 121 whereby, due to the voltage drop across resistor 121, the collector of transistor 109 is relatively positive.

The base of transistor 111 is connected to positive battery by way of resistor 123 and as normally conducting transistor 109 is drawing emitter current by way of common resistor 113, the base of transistor 111 is slightly positive relative to the emitter, and transistor 111 is nonconducting in the quiescent condition and its collector, connected to ground via resistor 119, is substantially at ground potential.

The first positive pulse obtained from junction B via diode 105 is applied to the base of transistor 109 by way of diode 125 and capacitor 127, raising the voltage of the base of transistor 109 above the voltage of the emitter and thus turning off transistor 109. This removes the collector current of transistor 109 whereby the collector voltage decreases and a negative pulse is applied to the base of transistor 111 by way of capacitor 131 lowering the base voltage of transistor 111 and thus turning on the transistor. With transistor 111 now conducting, the collector voltage is positive relative to the voltage of the collector of transistor 109.

The second positive pulse from junction B via diode 105 is applied to the base of transistor 111 via diode 129 and capacitor 131 turning off transistor 111. The collector voltage of transistor 111 drops, sending a negative pulse to the base of transistor 109 by way of capacitor 127 and transistor 109 is again turned on. The third positive pulse obtained from junction B by way of diode 105 is applied via diode 125 and capacitor 127 to the base of transistor 109 turning off transistor 109 which in turn turns on transistor 111.

Thus, it is seen that if an even number of teletypewriter contacts 1 close, transistor 111 will be turned on when multivibrator 35 has stopped oscillating. Similarly, if and odd number of teletypewriter contacts 1 are closed transistor 109 will be turned on when multivibrator 35 stops oscillating. In the event that transistor 111 is turned on after multivibrator 35 has stopped oscillating, capacitor 13 slowly charges from positive battery by way of resistor 123 and when the base voltage of transistor 111 is raised above the emitter voltage transistor 111 turns off and transistor 109 turns on. Flip-flop 107 is thus returned to the normal quiescent state.

The collector of transistor 109 is connected to positive battery by way of photodiode 19, which is termed the even photodiode, diode 133, junction C, resistor 137 and resistor 139. The collector of transistor 111 is connected to positive battery by way of photodiode 21, which is termed the odd photodiode, diode 135, junction C, resistor 137 and resistor 139. As it has been assumed that a teletypewriter character containing an even number of mark elements is sensed in tape 7, transistor 111 is turned on after mutivibrator 35 stops oscillating, even photodiode 19 is sensing black spot 11 on tape 7 and therefore exhibiting a substantially high impedance and odd photodiode 21 is exhibiting a substantially low impedance. Thus, since the collector voltage of transistor 111 is relatively positive and the impedance of even photodiode 19 is relatively high, the current flow through diodes 133 and 135 and thus the current flow through resistors 137 and 139 is negligible and the voltage of junction C is substantially positive.

In the event that teletypewriter contacts 1 operate improperly whereby an odd number of contacts 1 close when the sensing pins sense a teletypewriter character containing an even number of punch holes, transistor 111 is turned off and odd photodiode 21 exhibits a relatively low impedance. Thus the collector voltage of transistor 111 is at about ground potential and a substantial amount of current would flow via resistors 139 and 137, junction C, diode 135 and odd photodiode 21 to the collector of transistor 111 thus lowering the voltage of junction C. Similarly, if an even number of teletypewriter contacts 1 improperly close when the sensing pins sense a character containing an odd number of mark elements, transistor 109 is turned off and even photodiode 19 exhibits a low impedance whereby substantial current flows via resistors 139 and 137 and the voltage at junction C is substantially lowered.

If the voltage of junction C is lowered, the voltage of the base of transistor 141, which is connected to junction C, is lowered below the emitter voltage and transistor 141 is turned on. Collector current of transistor 141 flows to negative battery by way of resistor 59 raising the base voltage of transistor 57 above the collector voltage and thus turning transistor 57 off. When transistor 57 turns off, the previously described shunt is removed from around control lamp 63 and resistor 65 and current flows from ground via the filament of control lamp 63, resistor 65 and resistor 61 to negative battery, energizing control lamp 63 and lowering the voltage at the junction of resistors 65 and 61. This lowers the collector voltage of transistor 57 below ground potential. As the collector transistor 57 is connected to positive battery by way of resistor 145 and resistor 143, the voltage at the junction of resistors 145 and 143 is decreased thereby decreasing the base voltage of transistor 141 by way of diode 147. This maintains transistor 141 conducting and transistor 57 non-conducting. Since transistor 57 is turned off and collector current no longer flows through the clutch magnet 5, and since resistors 143 and 145 are of relatively large magnitude with respect to the resistance of clutch magnet 5 and resistor 61, negligible current flows through clutch magnet 5. Therefore, clutch magnet 5 is de-energized and the transmitter-distributor stops.

After corrective action is taken, the transmitter-distributor can be restarted by the momentary operation of key 149. Key 149 when operated places ground on the collector of transistor 57 and thus raises the voltage at the junction of resistors 145 and 143. This raises the base voltge of transistor 141 and turns off transistor 141. This then turns on transistor 57 again energizing clutch magnet 5 and turns off control lamp 63 in the same manner as previously described.

Attention is called to the fact that there is a short period, during which mutlivibrator 35 is oscillating and transistors 109 and 111 of flip-flop 107 are alternately turned off, while there is light on photodiode 19 or 21. To prevent transistor 141 from conducting during this time it is necessary to provide circuit 151, known as the match check circuit, which includes crystal 161.

In the normal quiescent state, junction B is relatively positive. The upper electrode of crystal 161, as shown in FIG. 1, is maintained relatively positive, as junction B is connected to positive battery by way of resistor 153 and resistor 155 and the upper electrode of crystal 161 is connected to the junction of resistors 153 and 155. The lower electrode of crystal 161 is connected to the base of transistor 157 and to negative battery by way of resistor 159. The lower electrode of crystal 161 is therefore negative relative to the upper electrode and crystal 161 is normally oriented as shown by the arrow in FIG. 1. In addition, the base of transistor 157 is negative relative to its emitter and transistor 157 is normally conducting. Therefore, the emitter-to-collector impedance of transistor 157 is relatively small and resistor 139 is substantially shunted by the path through the emitter and collector of transistor 157.

The magnitude of the resistance of resistor 137 is relatively small with respect to the impedances of photodiodes 19 and 21 and the voltage drop across resistor 137 is therefore insufficient to lower the voltage of junction C below the emitter voltage of transistor 141 and transistor 141 is maintained non-conducting.

During the first negative going voltage cycle of junction B, capacitor 165 rapidly discharges by way of diode 163 lowering the voltage on the upper electrode of crystal 161 to about ground potential and thus switching crystal 161. During the next half cycle, when junction B again becomes relatively positive, capacitor 165 charges by way of resistor 153, slowly raising the voltage on the upper electrode of crystal 161. Before the voltage on crystal 161 can be sufficiently raised to switch crystal 161, however, junction B again becomes negative, discharging capacitor 165 via diode 163. A negative potential is thus maintained on crystal 161 during the oscillations of multivibrator 35.

When multivibrator 35 stops oscillating, junction B is maintained at a relatively high potential, capacitor 165 charges via resistor 153 and the voltage on crystal 161 rises sufficiently to switch crystal 161. A positive pulse is thus applied to the base of transistor 157 while crystal 161 is being switched, momentarily turning off transistor 157. During the time transistor 157 is turned off, the emitter-to-collector shunt around resistor 139 is removed. Therefore, after multivibrator 35 stops oscillating, the shunt is removed from resistor 139 and the voltage of junction C will decrease to turn on transistor 141 if the position of flip-flop 107 does not match spot 11 or 13 sensed by photodiode 19 or 21, as previously described.

Although a specific embodiment of the invention has been shown and described, it will be understood that various modifications may be made without departing from the spirit of this invention and such modifications are within the scope of the appended claims.

What is claimed is:

1. A counting circuit comprising a first storage circuit, an input circuit for storing unit electrical conditions in said first storage circuit, a second storage circuit, a trigger circuit having two states, means distinct from said input circuit and responsive to the operation of said trigger circuit to one of said states for shifting a single unit condition from said first storage circuit to said second storage circuit and means jointly responsive to the operation of said trigger circuit to the other of said states and the storage of said unit condition in said second storage circuit for reoperating said trigger circuit to said one state.

2. A counting circuit comprising a first storage circuit for storing a plurality of unit electrical conditions, a plurality of parallel input circuits for individually storing unit electrical conditions in said first storage circuit, a second storage circuit, a trigger circuit having a stable and an unstable state, means distinct from said input circuits and responsive to the operation of said trigger circuit to said unstable state for shifting a single unit condition from said first storage circuit to said second storage circuit and means jointly responsive to the operation of said trigger circuit to said stable state and the storage of said unit condition in said second storage circuit for reoperating said trigger circuit to said unstable state.

3. A counting circuit comprising a storage circuit for storing a plurality of unit electrical conditions, a plurality of parallel input circuits for individually storing unit electrical conditions in said storage circuit, means for selectively energizing said input circuits in accordance with a predetermined code, a trigger circuit having two states, a reset circuit for operating said trigger circuit to one of said states, means distinct from said input circuits and jointly responsive to the operation of said trigger circuit to said one state and the storage of said electrical conditions in said storage circuit for removing a unit electrical condition from said storage circuit and conditioning said reset circuit and means responsive to the operation of said trigger circuit to the other of said states for operating said conditioned reset circuit.

4. A counting circuit comprising a storage circuit for storing a plurality of unit electrical conditions, a plurality of parallel input circuits for individually storing unit electrical conditions in said storage circuit, a trigger circuit having a stable and an unstable state, a trigger feedback circuit means distinct from said input circuits and jointly responsive to the operation of said trigger circuit to said unstable state and the storage of said electrical conditions in said storage circuit for removing a unit electrical condition from said storage circuit and conditioning said feedback circuit and means including said conditioned feedback circuit and responsive to the operation of said trigger circuit to said stable state for operating said trigger circuit to said unstable state.

5. A counting circuit comprising a storage circuit for storing a plurality of unit electrical conditions, a plurality of parallel input circuits for individually storing unit electrical conditions in said storage circuit, means for selectively energizing said input circuits in accordance with a predetermined code, a trigger circuit having a stable and an unstable state, a reset circuit for operating said trigger circuit to said unstable state, a second storage circuit, means distinct from said input circuits and jointly responsive to the operation of said trigger circuit to said unstable state for shifting a single unit electrical condition from said first storage circuit to said second storage circuit and means jointly responsive to the operation of said trigger circuit to said stable state and the storage of said unit condition in said second storage circuit for enabling said reset circuit.

6. A counting circuit comprising a first ferroelectric capacitor, an input circuit for applying polarizing voltages across said first capacitor, a second ferroelectric capacitor in series with said first capacitor, a monostable trigger circuit for generating a pair of alternate voltage potentials, a switching circuit for applying one of said voltage potentials across said second capacitor and said first capacitor and the other of said voltage potentials across said second capacitor and a feedback circuit including said switching circuit and said second capacitor for operating said trigger circuit in response to said other voltage potential.

7. A counting circuit comprising a first ferroelectric capacitor, a plurality of input circuits for applying polarizing voltages to said first capacitor, a second ferroelectric capacitor in series with said first capacitor, the electrode area of said first capacitor being at least twice as great as the electrode area of said second capacitor, a monostable trigger circuit for generating a pair of alternate voltage potentials, an asymmetric conductive circuit for applying one of said voltage potentials across said second capacitor and said first capacitor and the other of said voltage potentials across said second capacitor and a feedback circuit including said asymmetric circuit and said second capacitor for operating said trigger circuit in response to said other voltage potential.

8. A counting circuit comprising a plurality of ferroelectric capacitors, a common ferroelectric capacitor in series with each of said plurality of capacitors, a plurality of input circuits for selectively applying voltage potentials across said plurality of capacitors and said common capacitor, a further ferroelectric capacitor in series with said common capacitor, a monostable trigger circuit for generating a pair of alternate voltage potentials, an asymmetrically conductive circuit for applying one of said voltage potentials across said further capacitor and said common capacitor and the other of said voltage potentials across said further capacitor and a feedback circuit including said asymmetric circuit and said further capacitor for operating said trigger circuit in response to said other voltage potential.

9. A counting circuit comprising a plurality of unit area ferroelectric capacitors, a common ferroelectric capacitor in series with each of said plurality of capacitors, the electrode area of said common capacitor being at least as great as the sum of the electrode areas of said plurality of unit area capacitors, a plurality of input circuits for selectively applying voltage potentials across said plurality of capacitors and said common capacitor, a further unit area ferroelectric capacitor in series with said common capacitor, a monostable trigger circuit for generating a pair of alternate voltage potentials, an asymmetric conductive circuit for applying one of said voltage potentials across said further capacitor and said common capacitor and the other of said voltage potentials across said further capacitor and a feedback circuit including said asymmetric circuit and said further capacitor for operating said trigger circuit in response to said other voltage potential.

10. A counting circuit comprising a plurality of ferroelectric capacitors, a common ferroelectric capacitor, a common junction between said common capacitor and said plurality of capacitors, means for selectively applying polarizing voltages across said common capacitor and said plurality of capacitors, a further ferroelectric capacitor in series with said common capacitor, a monostable trigger circuit for generating a pair of alternate voltage potentials, an asymmetrically conductive circuit for applying one of said alternate voltage potentials across said common capacitor and said further capacitor and a feedback circuit including said asymmetric circuit and said further capacitor for operating said trigger circuit in response to the generation of the other of said alternate voltage potentials.

11. A counting circuit comprising a first ferroelectric capacitor, means for selectively applying polarizing voltages across said first capacitor, a second ferroelectric capacitor in series with said first capacitor, a monostable trigger circuit for generating a pair of alternate voltage potentials, an asymmetrically conductive circuit for applying one of said alternate voltage potentials across said first capacitor and said second capacitor and a feedback circuit including said asymmetric circuit and said second capacitor for operating said trigger circuit in response to the generation of the other of said alternate voltage potentials.

12. A counting circuit comprising a first ferroelectric capacitor, an input circuit for storing unit electrical charges on said first capacitor, a second ferroelectric capacitor, a monostable trigger circuit, means responsive to the operation of said trigger circuit for generating a pair of alternate voltage potentials, means distinct from said input circuit and responsive to one of said voltage potentials for shifting a unit electrical charge from said first capacitor to said second capacitor, and a trigger feedback circuit jointly responsive to the storage of said unit electrical charge in said second capacitor and the other one of said voltage potentials for reoperating said trigger circuit.

13. A counting circuit comprising a first ferroelectric capacitor, an input circuit for storing unit electrical charges on said first capacitor, a second ferroelectric capacitor, a monostable trigger circuit having a stable and unstable state, means distinct from said input circuit and responsive to the operation of said trigger circuit to said unstable state for shifting a single unit charge from said first capacitor to said second capacitor, and means jointly responsive to the operation of said trigger circuit to said stable state and the storage of said unit charge in said second capacitor for reoperating said trigger circuit to said unstable state.

References Cited in the file of this patent

UNITED STATES PATENTS

| | | |
|---|---|---|
| 2,591,931 | Grosdoff | Apr. 8, 1952 |
| 2,666,195 | Bachelet | Jan. 12, 1954 |
| 2,695,396 | Anderson | Nov. 23, 1954 |
| 2,695,397 | Anderson | Nov. 23, 1954 |
| 2,717,372 | Anderson | Sept. 6, 1955 |
| 2,841,705 | Moerman | July 1, 1958 |
| 2,854,590 | Wolfe | Sept. 30, 1958 |
| 2,864,079 | Anderson | Dec. 9, 1958 |
| 2,872,661 | Young et al. | Feb. 3, 1959 |
| 2,930,906 | Wolfe | Mar. 29, 1960 |